(12) United States Patent
Parkin et al.

(10) Patent No.: US 11,165,570 B2
(45) Date of Patent: Nov. 2, 2021

(54) QUANTUM KEY DISTRIBUTION IN OPTICAL COMMUNICATIONS NETWORK

(71) Applicant: British Telecommunications Public Limited Company, London (GB)

(72) Inventors: Neil Parkin, London (GB); Andrew Lord, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 217 days.

(21) Appl. No.: 16/494,564

(22) PCT Filed: Mar. 9, 2018

(86) PCT No.: PCT/EP2018/055948
§ 371 (c)(1),
(2) Date: Sep. 16, 2019

(87) PCT Pub. No.: WO2018/166920
PCT Pub. Date: Sep. 20, 2018

(65) Prior Publication Data
US 2021/0126778 A1      Apr. 29, 2021

(30) Foreign Application Priority Data
Mar. 16, 2017  (EP) .................................... 17161330

(51) Int. Cl.
*H04L 9/08* (2006.01)
*H04J 14/08* (2006.01)
(Continued)

(52) U.S. Cl.
CPC ........... *H04L 9/0852* (2013.01); *H04B 10/85* (2013.01); *H04Q 11/0005* (2013.01);
(Continued)

(58) Field of Classification Search
CPC ....................................................... H04J 14/08
See application file for complete search history.

(56) References Cited

U.S. PATENT DOCUMENTS

| 9,271,058 B2 | 2/2016 | Lord |
| 9,560,429 B2 | 1/2017 | Lord |
| (Continued) | | |

FOREIGN PATENT DOCUMENTS

| CN | 101292455 A | 10/2008 |
| CN | 103929251 | 7/2014 |
| (Continued) | | |

OTHER PUBLICATIONS

European Application 17161330.0, Search Report, dated Aug. 30, 2017, 10 pages.
(Continued)

*Primary Examiner* — Shi K Li
(74) *Attorney, Agent, or Firm* — Patterson Thuente Pedersen, P.A.

(57) ABSTRACT

A method for operating a communications network node, the node including a first amplified optical section, a second non-optical section, and an optical bypass section the method including receiving at the node, a first optical channel at a first wavelength and a second optical channel at a second wavelength; directing the first optical channel to the first amplified optical section; directing the second optical channel to the second non-optical section during a first time period; and directing the second optical channel to the optical bypass section during a second time period.

21 Claims, 10 Drawing Sheets

(51) Int. Cl.
*H04B 10/85* (2013.01)
*H04Q 11/00* (2006.01)

(52) U.S. Cl.
CPC . *H04Q 11/0062* (2013.01); *H04Q 2011/0016* (2013.01); *H04Q 2011/0086* (2013.01)

(56) References Cited

U.S. PATENT DOCUMENTS

| | | | |
|---|---|---|---|
| 9,654,248 B2 | 5/2017 | Wright | |
| 9,693,123 B2 | 6/2017 | Lord | |
| 9,860,012 B2 | 1/2018 | Wright | |
| 2007/0076884 A1* | 4/2007 | Wellbrock | H04L 9/0855 380/263 |
| 2007/0212063 A1* | 9/2007 | Meli | H04J 14/0246 398/30 |
| 2012/0195428 A1 | 8/2012 | Wellbrock | |
| 2014/0341575 A1* | 11/2014 | Choi | H04B 10/294 398/51 |
| 2015/0326955 A1 | 11/2015 | Lord | |
| 2016/0013864 A1 | 1/2016 | Porti | |
| 2016/0057515 A1 | 2/2016 | Lord | |

FOREIGN PATENT DOCUMENTS

| | | |
|---|---|---|
| CN | 104092538 A | 10/2014 |
| CN | 107465502 A | 12/2017 |
| EP | 0812078 | 12/1997 |
| EP | 1774695 A2 | 4/2007 |
| EP | 2266250 A1 | 12/2010 |
| GB | 2514134 A | 11/2014 |
| GB | 2514134 | 5/2016 |
| WO | WO2006/014298 | 2/2006 |
| WO | WO2009/112286 | 9/2009 |
| WO | WO2018060530 A1 | 4/2018 |
| WO | WO2018141681 A1 | 8/2018 |
| WO | WO2019016263 A1 | 1/2019 |

OTHER PUBLICATIONS

Nweke N I et al., "EDF a bypass and filtering architecture enabling AKD+WDM coexistence on mid-span amplified links", Technical Digest CD-ROM/Conference on Lasers and Electro-optics, Quantum Electronics and Laser Science Conference, Conference on Photonic Applications, Systems and Technologies; Long Beach Convention Center, Long Beach, California, May 21, 2006, pp. 1-2.

Runser R J et al., "Demonstration of 1.3/spl mu/m quantum key distribution (QKD) compatibility with 1.5 / spl mu/m metropolitan wavelength division multiplexed (WDM) systems" 2005 Optical Fiber Communications Conference Technical Digest (IEEE CAT. No. 05CH37672) IEEE Piscataway, NJ, USA, IEEE, vol. 3, Mar. 6, 2005, pp. 206-208.

Rohde H et al., "Quantum key distribution integrated into commercial WDM systems", Optical Fiber Communication/National Fiber Optic Engineers Conference, 2008, OFC/NFOEC 2008, Conference on IEEE, Piscataway, NJ, USA, Feb. 24, 2008, pp. 1-3.

International Search Report and Written Opinion, International Application No. PCT/EP2018/055948, date of completion May 28, 2018, 10 pages.

Aleksic et al., "Impairment Evaluation towards QKD Integration in a Conventional 20-Channel Metro Network", 2015 Optical Fiber Communications Conference and Exhibition (OFC), Electronic ISBN: 978-1-5575-2937-4, date of conference Mar. 22-26, 2015, 3 pages.

Chapuran et al., "Optical networking for quantum key distribution and quantum communications" New Journal of Physics 11 (2009) 105001), Published Oct. 7, 2009, 19 pages.

Application No. GB1704178, Search Report, dated Sep. 14, 2017, 6 pages.

Aleksic et al., "Towards a smooth integration of Quantum Key Distribution in metro networks", 2014 16th International Conference on Transparent Optical Networks (ICTON), Electronic ISBN: 978-1-4799-5601-2, date of conference Jul. 6-10, 2014, 4 pages.

First Office Action dated Jun. 2, 2020 for Chinese Application No. 201880018103.7, 17 pages.

International Preliminary Report on Patentability for Application No. PCT/EP2018/055948, dated Sep. 26, 2019, 9 pages.

* cited by examiner

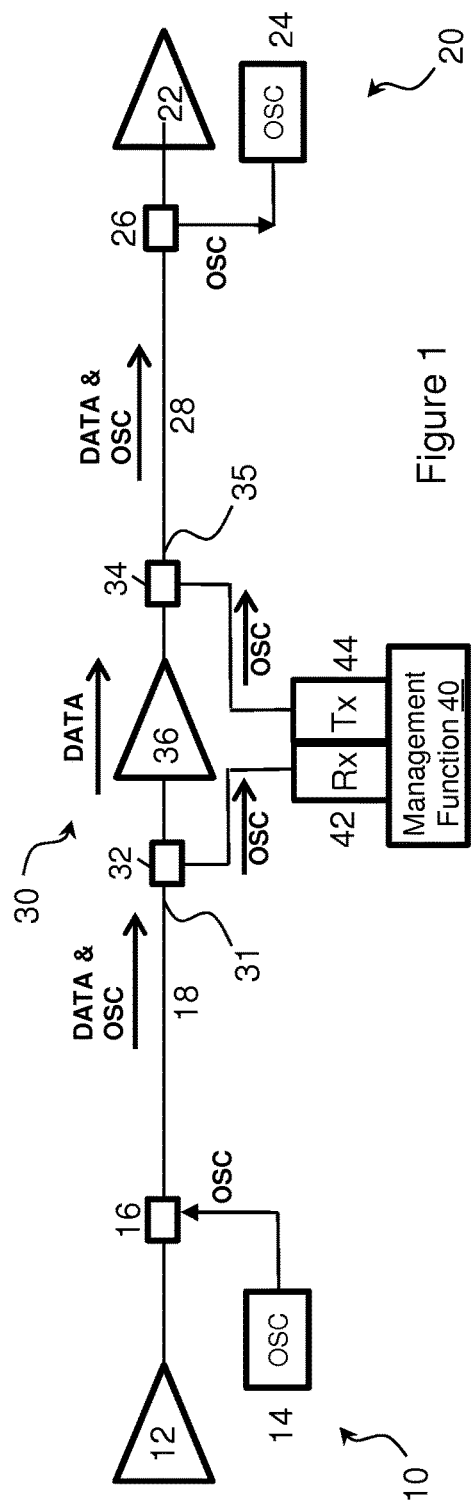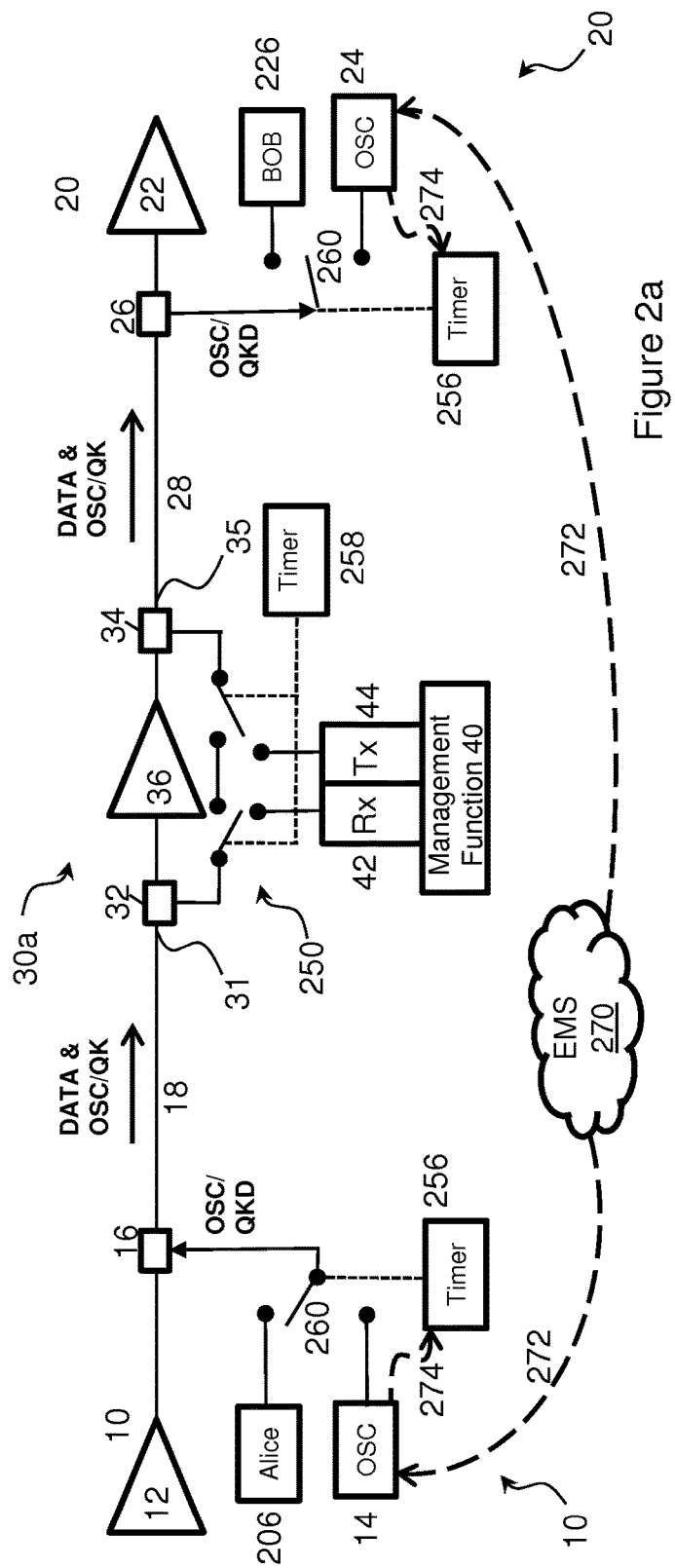
Figure 1
Figure 2a

ND OPTICAL COMMUNICATIONS NETWORK

QUANTUM KEY DISTRIBUTION IN OPTICAL COMMUNICATIONS NETWORK

CROSS-REFERENCE TO RELATED APPLICATION

The present application is a National Phase entry of PCT Application No. PCT/EP2018/055948, filed Mar. 9, 2018, which claims priority from European Patent Application No. 17161330.0 filed Mar. 16, 2017, each of which is fully incorporated herein by reference.

TECHNICAL FIELD

The disclosure relates to optical communication networks and to a node for operation in such networks.

INTRODUCTION

Encryption keys are used in the safeguarding of data from unauthorized access by making the data unreadable by anyone who does not have the correct key. Secure sharing of encryption key allows only authorized users to read protected data by using decryption. For practical reasons, sharing of these keys is commonly carried out over communication networks. The invention has particular application to quantum key distribution and also has application to communication of other forms of information by means of streams of single photons. The invention may also be used to share non-quantum keys, such as an RSA key.

Long-haul or core data communications links using DWDM, commonly carry optical signals comprising two channels: data and signaling. Out-of-band optical signaling channels are used to carry status information about the DWDM network and for other purposes, for example communication between nodes, software updates to nodes and retrieving from nodes performance data such as optical power readings. The optical supervisory channel (OSC) is a dedicated, out-of-band signaling channel used to communicate and manage remote (also known as "Intermediate") nodes. A conventionally configured OSC communications network is shown in FIG. 1 comprising sections of optical fiber, optical amplification sections and non-optical (e.g. electrical) sections. Non-optical sections commonly occur in long-distance optical communications links for the purpose of management or switching of signals. FIG. 1 shows two end points 10, 20 and a remote, intermediate node or "field amplification site" 30 comprising a first port 31 connected to end point 10 over a first optical connection 18 and a second port 35 connected to end point 20 over a second optical connection 28. Connected between first and second ports, the intermediate node 30 comprises, an optical amplifier 36 (in general an EDFA) and an electrical management function 40. For clarity, FIG. 1 only shows a single connection, over which data and OSC travel in one direction (as shown in the Figure: from end point 10 to end point 20). In practice a similar connection using separate fiber will normally be present over which data and OSC travel in the opposite direction (i.e., in the Figure, from end point 20 to end point 10). End points 10, 20 comprise optical data communication interfaces 12, 22 and OSC equipment 14, 24. End points 10, 20 and intermediate node 30 are connected by optical connections, with end point 10 connected to intermediate node 30 over a first optical connection 18 and with end point 20 connected to intermediate node 30 over a second optical connection 28. Optical connections are typically optical fibers. For simplicity the network shown in FIG. 1 is unidirectional, i.e. with signals flowing from end point 10 to end point 20. It will be appreciated that a similar arrangement may be used to transport signals in the reverse direction from end point 20 to end point 10 and that the present invention applies to communications in both directions. Optical filter 16 at end point 10 combines optical data signals produced by optical data communication interfaces 12 and OSC signals produced by OSC equipment 14. A corresponding optical filter 26 at end point 20 separates the optical data signals and OSC signals according to wavelength, directing the optical data signals to optical data communication interface 22 and the OSC signals to OSC equipment 24.

Optical filters 32, 34 alter onward transmission of incident optical signals dependent on the optical signal wavelength and may comprise wavelength division multiplexer/demultiplexers. Exploiting the out-of-band nature of the OSC, an appropriate wavelength (e.g. 1510 nm) optical separator (for example an optical filter) 32 is placed on the side of the intermediate node 30 that receives signals from end point 10 to allow the OSC signals to be separated from the data signals received via first optical connection 18 at intermediate node 30 so that the data signals are directed to optical amplification section 36, while the OSC is directed to management function 40. Corresponding optical filter 34 is placed on the other side of the intermediate node 30, i.e. the side that sends signals towards end point 20, to allow the regenerated OSC signals received from management function 40 to be combined onto second optical connection 28.

The OSC transmitted over first optical connection 18 is terminated (converted from optical to electrical) at optical receiver 42 of management function 40. In this way, information may be exchanged over the OSC with node management function 40. The OSC is then retransmitted at optical transmitter 44 of management function 40, as an optical signal on a typical OSC wavelength to be carried over second optical connection 28 towards end point 20. Optical filter 34, placed on the other side of the intermediate node 30 from optical filter 32, i.e. the side that sends signals towards end point 20, combines the regenerated OSC signals received from management function 40 with the retransmitted data signals onto second optical connection 28.

It has been proposed to use a dense wavelength division multiplexing (DWDM) data channel for key transfer but this results in loss of a valuable resource, i.e. a full DWDM data channel.

SUMMARY

There is a need to provide an improved method for transporting encryption keys, including quantum keys across an optical communications network.

The present disclosure accordingly provides, in a first aspect, a communications network node comprising: first and second optical ports, a first amplified optical section connected between the first and second optical ports and a second non-optical section connected between the first and second optical ports; in which the communications node also comprises a first optical filter comprising a first path for selected optical channels at a first wavelength and second path for selected optical channels at a second wavelength; in which the communications node also comprises a second optical filter comprising a third path for selected optical channels at the first wavelength and fourth path for selected optical channels at the second wavelength; in which a first composite path through the node comprises, in an order, the first optical port, the first path, the first amplified optical section, the third path and the second optical port; in which the communications node also comprises an optical bypass section and first and second optical junctions; in which the first optical junction comprising a fifth path and a sixth path; and in which the second optical junction comprising a seventh path and an eighth path; in which a second composite path through the node comprises, in an order, the first optical port, the second path, the fifth path, the second non optical section, the seventh path, the fourth path and the second optical port; in which a third composite path through the node comprises, in an order, the first optical port, the second path, the sixth path, the optical bypass section, the eighth path, the fourth path and the second optical port; in which the node is configured to pass a first optical channel at a first wavelength over the first composite path and in which the node is configured to pass a second optical channel at a second wavelength over the second composite path during a first time interval and over the third composite path during a second time interval.

In this way an all-optical path (i.e. the third composite path) that can carry information in the form of a stream of single photons is made available across a communications network node. Being all-optical, such a path may be used for quantum keys distribution. Advantageously, the path requires minimal additional hardware, given that it shares on a time-division basis hardware (i.e. the first optical port, the second path, the fourth path and the second optical port) used by another (i.e. the second composite) path.

The present disclosure accordingly provides, in a second aspect, a method for operating a communications network node; in which the node comprises a first amplified optical section and a second non-optical section; in which the method comprises: receiving at the node, a first optical channel at a first wavelength and a second optical channel at a second wavelength; directing the first optical channel to the first amplified optical section; in which the node further comprises an optical bypass section; in which the method further comprises: directing the second optical channel to the second non-optical section during a first time period and directing the second optical channel to the optical bypass section during a second time period.

The present disclosure accordingly provides, in a third aspect, a computer program element comprising computer program code to, when loaded into a computer system and executed thereon, cause the computer to perform the method set out above.

The optical bypass section defined in accordance with any aspect of the disclosure may be capable of carrying a signal on the second optical channel from the first optical port to the second optical port. The signal on the second optical channel may be a single-photon stream.

Further features of various embodiments of the disclosure are set out in the dependent claims appended hereto.

BRIEF DESCRIPTION OF THE FIGURES

In order that the present disclosure may be better understood, embodiments thereof will now be described, by way of example only, with reference to the accompanying drawings in which:

FIG. 1 shows a conventional communications network.

FIGS. 2a, 2b, 4, 5a, 5b, 5c, and 7 show communications networks according to embodiments of the disclosure.

DETAILED DESCRIPTION OF EMBODIMENTS

Figure 2B:
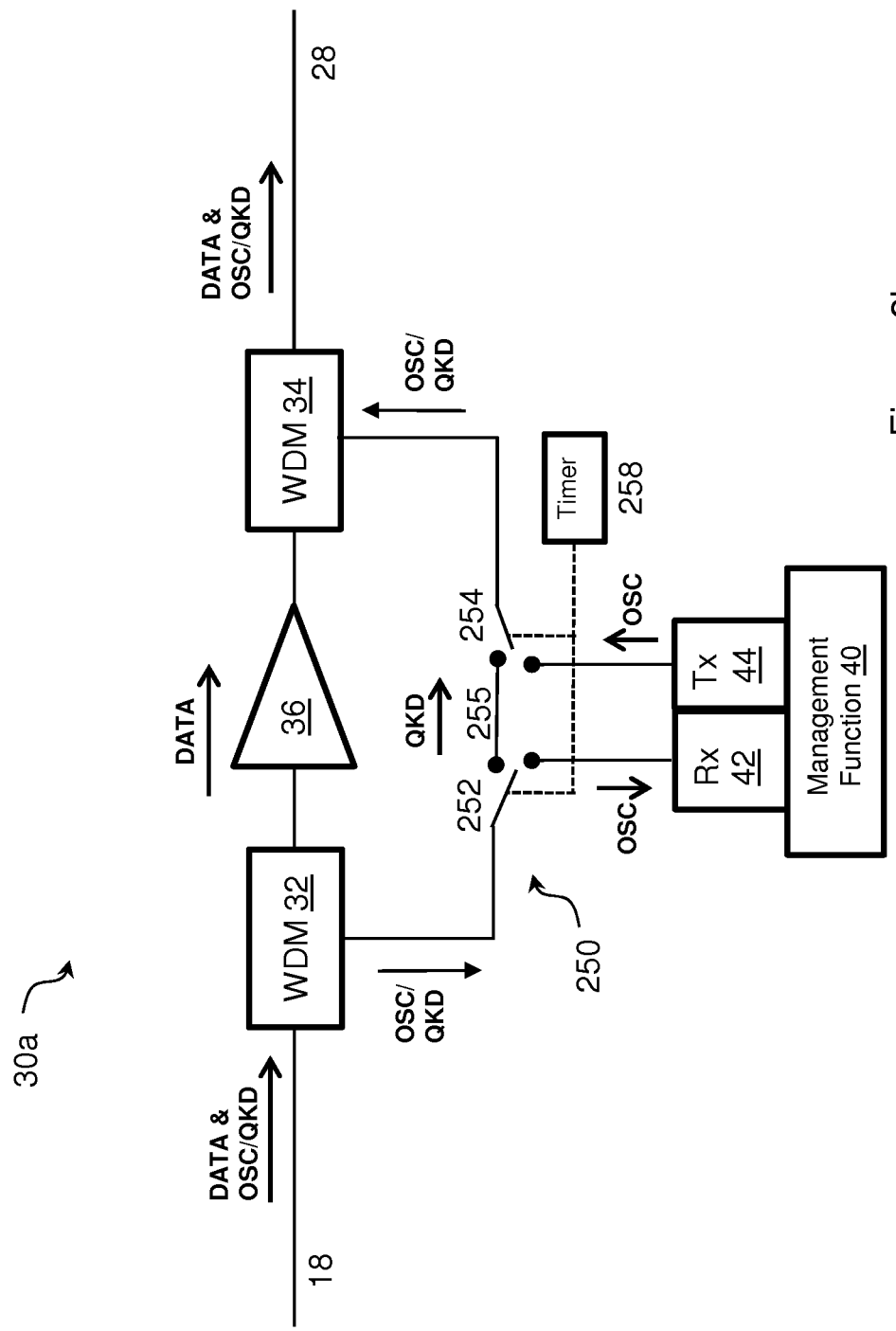

In an optical communications network according to the invention, a continuous, end-to-end optical path is created to allow the transfer of an encryption key or other information by means of a stream of single photons by bypassing amplification and non-optical sections. In the following, reference to the transfer of an encryption key also indicates, where appropriate, communication of other information by means of a stream of single photons. Transmission over the end-to-end optical path may use a wavelength normally used by a signaling channel in a conventional optical network. The signaling channel may be disabled during key transfer and reinstated to normal operation, once the key has been transferred. OSC signaling channels use a wavelength, typically at 1510 nm, 1610 nm or 1310 nm, which is "out-of-band"—outside the usual amplification band of DWDM optical amplifiers normally used for data transport.

A problem with using signaling channels in this way is that the optical path used to transport the signaling channel is terminated (i.e. converted to electrical) at intermediate nodes in the optical communications network, for example, to allow status information to be read and modified at an optical communications network management function before being optically retransmitted. The standard signaling channel is unsuitable as a transmission medium for optical encryption keys. In particular, quantum keys have to be transported from end-to-end in the optical domain in order to preserve their state and so that the information they carry can be correctly read at the far end. It is therefore proposed to re-engineer the signaling channel, so as to provide a continuous, end-to-end optical path, with no intermediate termination (i.e. no conversion to electrical at intermediate nodes).

According to an embodiment, the signaling channel is an optical supervisory channel (OSC). OSC connectivity is critical in long-haul DWDM and coarse wavelength division multiplexing (CWDM), as remote nodes are managed out of-band using the OSC. Use of the OSC wavelengths including 1310, 1510 nm or 1610 nm is widespread and benefits from low-cost, common parts. The attenuation at 1510 nm or 1610 nm is lower than at 1310 nm so allowing longer unamplified links. Communication at these two wavelengths also benefits from a reduction in amplified spontaneous emission (ASE) noise from the erbium-doped fiber amplifiers (EDFA) generally used in long haul DWDM links to amplify the data channels.

An encryption key can be transferred using a variety of methods according to various embodiments. According to an embodiment, continuous-variable, quantum-key distribution (CV-QKD) is used. CV-QKD has been shown to be resilient in the presence of the type of noise inherent in a DWDM link, making it particularly suitable for QKD over an amplified link.

FIG. 2a shows a communications network according to an embodiment of the disclosure. In FIG. 2a, features common with FIG. 1 bear the same reference numerals and will not be further discussed here, except where details are changed. In FIG. 2a, key exchange equipment 206, 226 are introduced to the end points 10, 20 and an optical bypass arrangement 250 is introduced connected between first and second ports 31, 35 at switched intermediate node 30a. Optical bypass arrangement 250 is controllable to enable, in a first state, "OSC operation", i.e. connection of the OSC via management function 40, and, in a second state, "key transfer operation", i.e. end-to-end optical transfer of an encryption key. According to an embodiment, at the end points 10, 20, optical switches 260 are provided to allow key exchange equipment 206, 226 to be selectively connected via first and second optical connections 18 28, respectively, to the switched intermediate node 30a in place of the OSC equipment 14, 24 for the purposes of key transport. According to embodiments, the optical switches may be implemented as MEM's using mechanical mirrors to reflect the light to different ports or arrangements where a connection is made or broken by mirrors activated, for example, using a stepper motor. Other suitable optical switches include piezo- and crystal-based types. According to an embodiment, key exchange equipment transmitter 206 uses a selected typical OSC wavelength and key exchange equipment receiver 226 receives at the selected typical OSC wavelength.

Optical bypass arrangement 250 is shown in more detail in FIG. 2b. According to the embodiment of FIG. 2b, bypass optical switches 252, 254 are used to selectively establish an optical bypass of the intermediate node 30 (including bypassing both optical amplification section 36 and management function 40) for the purposes of key transfer. Each of optical switches 252 and 254 comprises a form of optical junction, through which optical signals can follow different paths. As shown in the embodiment of FIG. 2b, optical bypass arrangement 250 comprises optical switches 252 and 254—which are interconnected to form a bypass 255. Accordingly, the node of FIG. 2b will pass data at a first wavelength via WDM 32, amplifier 36 and WDM 34; will pass, during a first time period, an OSC at a second wavelength via WDM 32, switch 252 (following a first path through the switch), management function 40, switch 254 (following a first path through the switch) and WDM 34 and will pass, during a second time period, an optical signal that may comprise a stream of single photons and may carry at least a part of an encryption key at the second wavelength via WDM 32, switch 252 (following a second path through the switch), optical bypass section 255, switch 254 (following a second path through the switch) and WDM 34. Therefore, during the first time period, the OSC will follow a first path through switch 252 and a first path through switch 254 (i.e. where the switches 252, 254 occupy a first state) and during the second time period, the optical signal will follow a second path through switch 252 and a second path through switch 254 (i.e. where the switches 252, 254 occupy a second state).

A network management system or Element Management System (EMS) 270 is also shown. The EMS allows all the elements to be controlled and monitored from a central application. According to embodiments of the disclosure, the EMS 270 initiates the QKD. QKD may be initiated, for example, in response to a user request or an automatically generated requirement to update an out-of-date security key. The connection state of the optical switches 252, 254 and 260 may be remotely controlled, e.g. by Element Management System (EMS) 270. EMS 270 is connected over Ethernet links 272 to the OSC equipment 14, 24 at each end point 10, 20 for communication of instructions relating to switching between OSC operation and key transfer operation. According to an embodiment, the OSC equipment 14, 24 is connected for communication of the instructions to local optical key transport timers 256 (i.e. timers located at one or other end point 10, 20) over Ethernet links 274 and over the OSC to optical key transport timers 258 located at each intermediate switched node 30a. Local optical key transport timers 256 are connected to control operation of endpoint switches 260. Optical key transport timers 258 located at each intermediate node are connected to control operation of bypass switches 252, 254 local to that intermediate node. In response to a message instructing "encryption key transfer", each optical key transport timer 256, 258 activates for a predetermined time interval to control the local switch or switches 260, 252, 254 to enable encryption key transfer.

To enable "OSC" operation, switches 260 connect OSC equipment 14, 24 to first and second optical connections 18 and 28, respectively. Also, to enable the OSC operation, bypass optical switch 252 connects optical filter 32 on first optical connection 18 with optical receiver 42, while bypass optical switch 254 connects optical transmitter 44 with optical filter 34 on second optical connection 28. In this way, the OSC from OSC equipment 14 is connected through management function 40 to OSC equipment 24. To enable "key transport" operation, bypass optical switch 252 disconnects optical receiver 42 and, instead, connects the signal from optical filter 32 directly or over optical fiber to bypass optical switch 254. Also to enable the "key transport" operation, bypass optical switch 254 disconnects optical transmitter 44 and, instead, connects the signal from optical filter 32 received through bypass optical switch 252 directly with optical filter 34. Also, in key transfer operation, switches 260 connect key exchange equipment 206, 226 to first and second optical connections 18 28, respectively. In this way, an encryption key signal from key exchange equipment transmitter 206 is switched over an end-to-end, all-optical path past intermediate node 30 to key exchange equipment receiver 226. In this embodiment, OSC source 14 is disconnected from first optical connection 18 for key transmission, by operation of optical switch 260 and so does not need to be disabled during key transmission. Advantageously, this removes a possible source of unreliability in disabling and re-enabling OSC source 14. According to an embodiment, switch 260 at endpoint 20 may be replaced by an optical coupler/splitter. Advantageously, during both OSC operation and key transport operation, the data channel may continue uninterrupted through amplifier 36.

Figure 3:
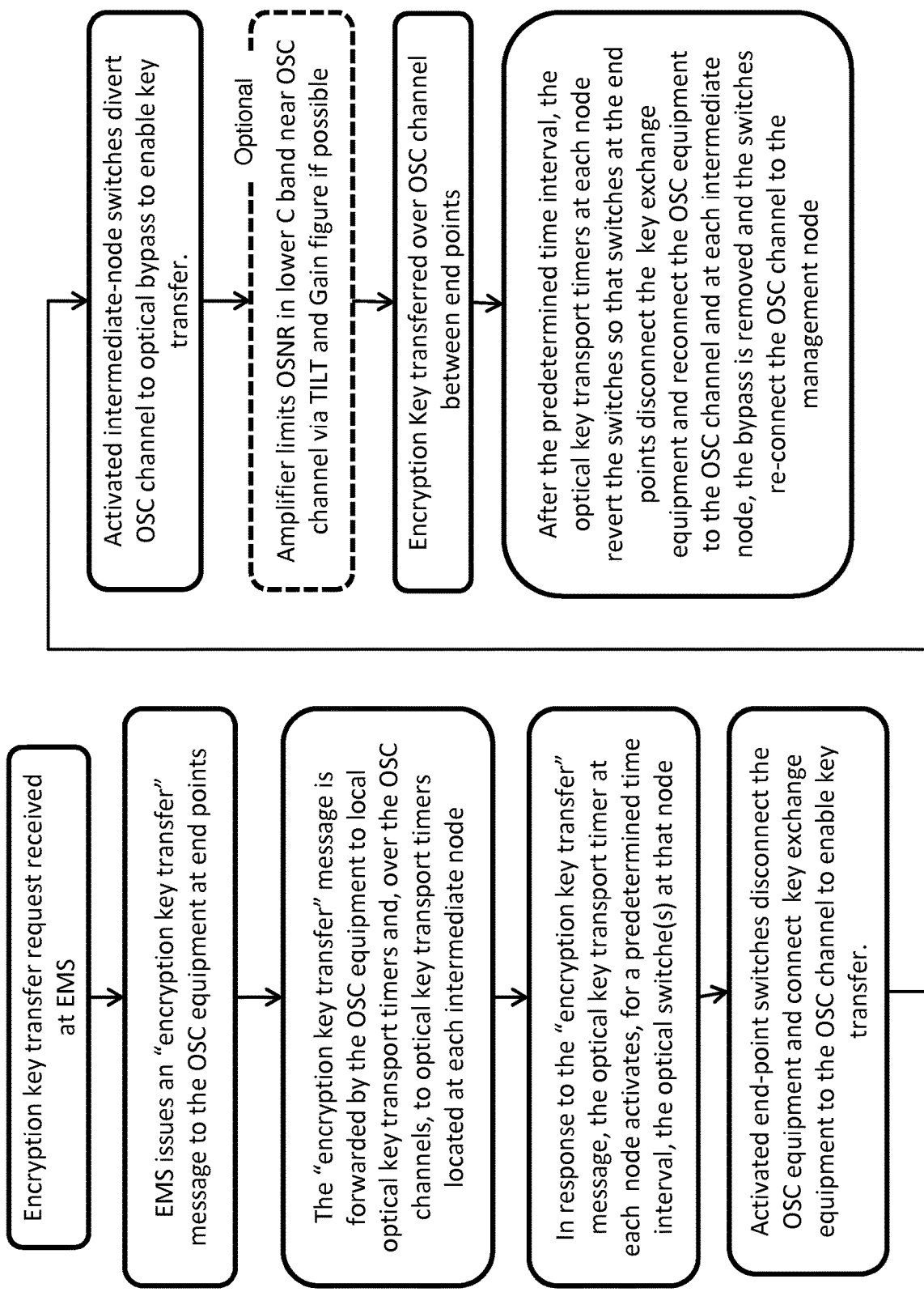
FIGS. 3, 6 and 8 are flow charts showing details of the operation of embodiments of the disclosure.

FIG. 3 shows operation of the communications networks of FIGS. 2a and 2b, with switched bypass, during encryption key transmission. As shown in FIG. 3, on receipt of an encryption key transfer request, EMS 270 issues an "encryption key transfer" message, for example over Ethernet links 274 to the OSC equipment 14, 24 at each end point 10, 20. The "encryption key transfer" message is forwarded by the OSC equipment to local optical key transport timers 256 and, over the OSC, to optical key transport timers 258 located at each intermediate node 30. In response to the "encryption key transfer" message, optical key transport timers 256, 258 activate for a predetermined time interval, the end point switches 260 and remote node Switches 252, 254, as follows. Once the "encryption key transfer" message has been forwarded to optical key transport timers 258 located at each switched intermediate node 30a, the end point switches 260 operate to disconnect the OSC equipment 14, 24 and connect key exchange equipment 206, 226 at each end point 10, 20 to the OSC to enable key transfer. That is, end point switch 260 at end point 10, switches to connect key exchange equipment transmitter 206 to the OSC on first optical connection 18 in place of OSC equipment 14. Similarly, end point switch 260 at end point 20 switches to connect key exchange equipment receiver 226 to the OSC on second optical connection 28 in place of OSC equipment 24. Activated bypass optical switches 252, 254 (shown in FIG. 2b) switch to divert the OSC at each intermediate node 30 to an optical bypass to enable key transfer. That is, bypass optical switch 252, switches to connect the OSC received on first optical connection 18 onto the bypass. Similarly, bypass optical switch 254, switches to connect the OSC received via bypass optical switch 252 to the OSC on second optical connection 28. The encryption key is now transmitted by key exchange equipment transmitter 206 and transferred to key exchange equipment 226 over the OSC using the end-to-end all optical path created.

According to an embodiment, the data channel amplifier 36 can attempt to limit the optical noise at wavelengths close to the selected QKD channel wavelength by altering the amplification gain near that channel. This is sometimes termed "TILT" control.

After the predetermined time interval, the optical key transport timers at each node revert the switches 260, 252, 254 to their normal, OSC state. According to an embodiment, this occurs at a time determined by the configuration of the timers and will occur whether or not the key transfer has successfully completed. That is, end point switch 260 at end point 10, disconnects key exchange equipment transmitter 206 from the OSC on first optical connection 18 and reconnects the OSC equipment 14. Similarly, end point switch 260 at end point 20, disconnects key exchange equipment receiver 226 from the OSC on second optical connection 28 and reconnects the OSC equipment 24. At each intermediate node, the bypass is removed and optical switches 252, 254 reconnect the OSC with management function 40.

Figure 4:
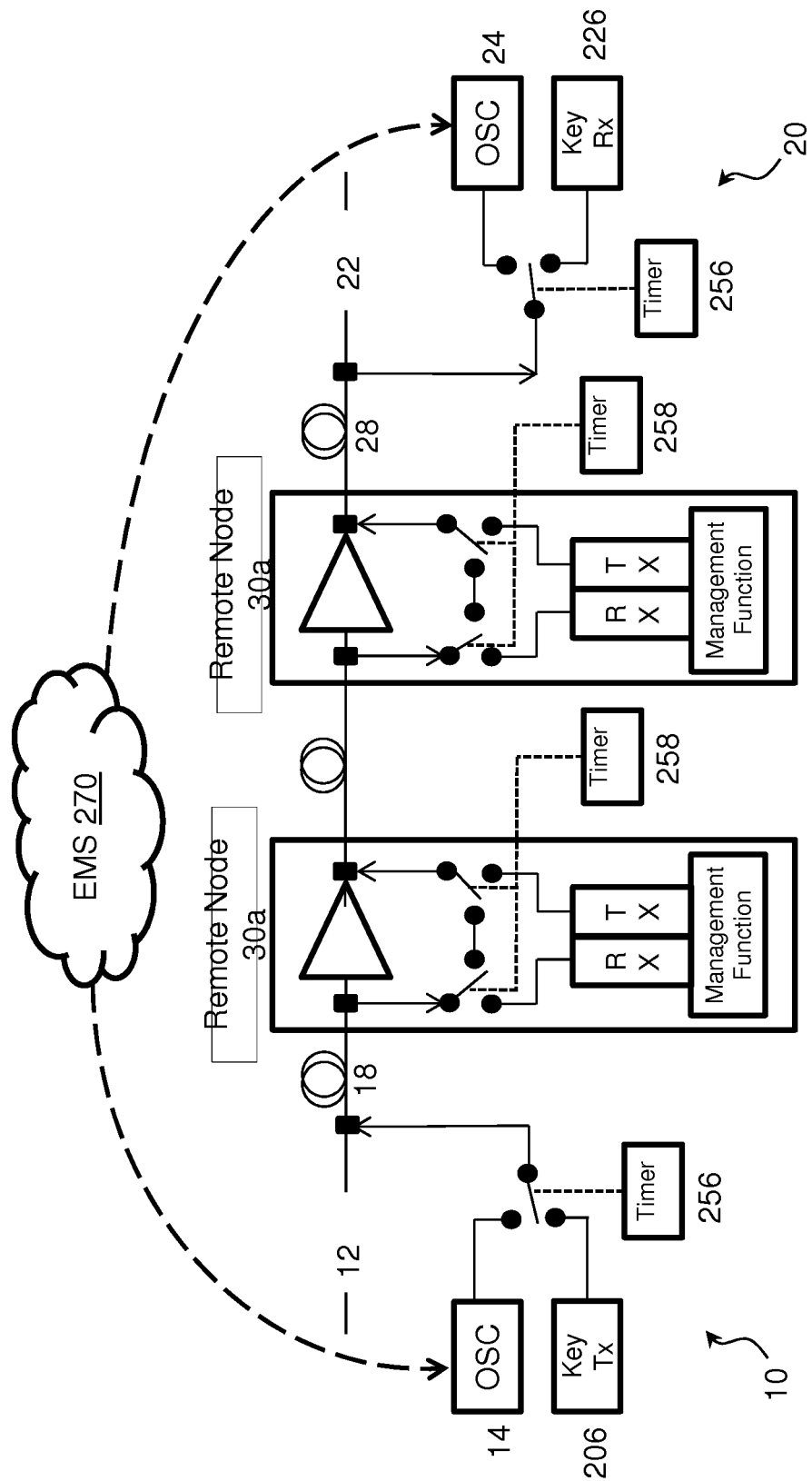

FIG. 4 shows a similar arrangement to FIG. 2a but showing two switched intermediate nodes 30a instead of one. It will be understood that the disclosure is not limited to any particular number of intermediate nodes but has application to any number of such nodes, i.e. where the optical output of one such node provides the optical input to the next such node.

Figure 5A:
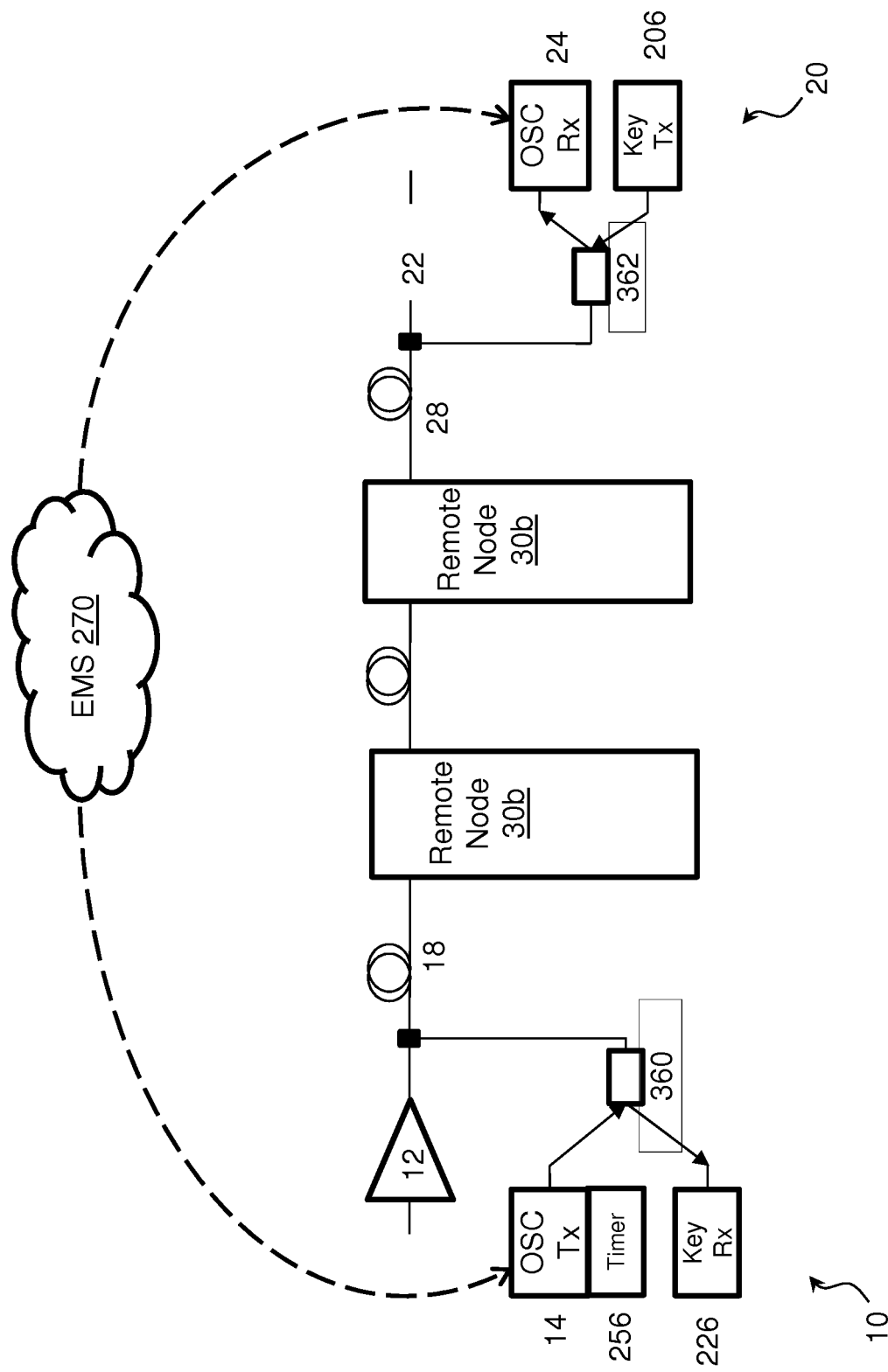
Figure 5B:
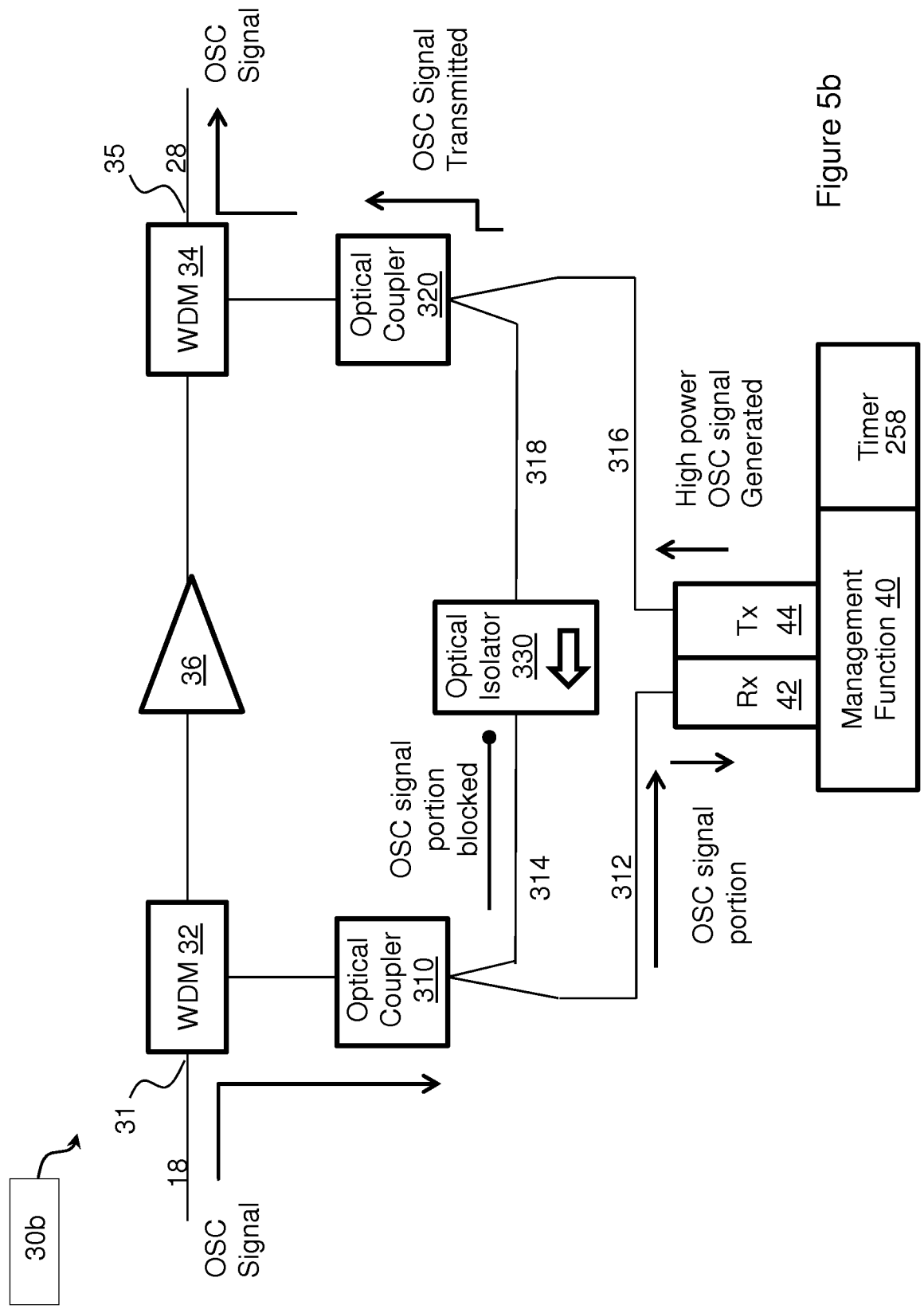
Figure 5C:
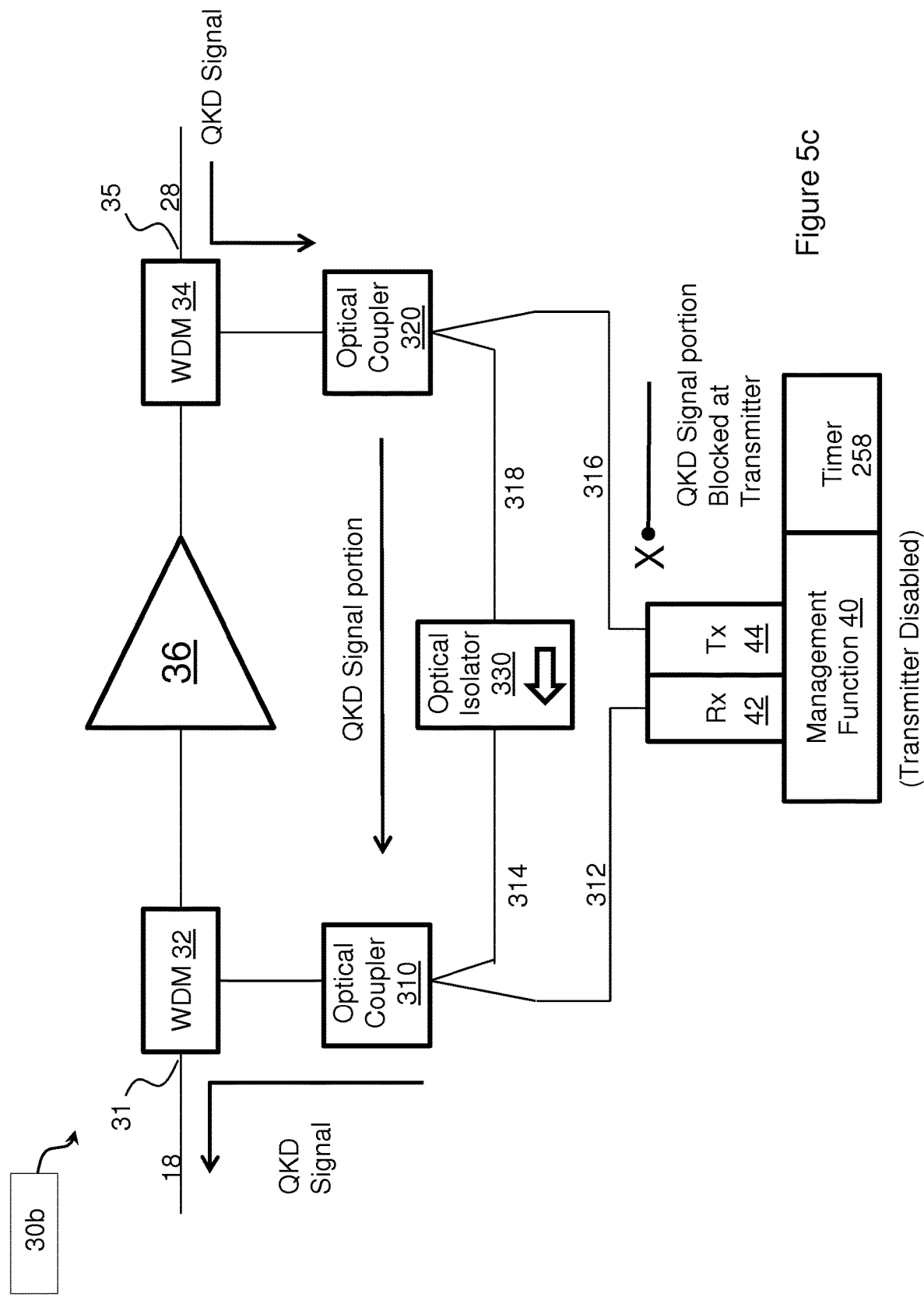

FIGS. 5a, 5b and 5c show further embodiments which remove the switches of FIGS. 2a, 2b and 4 and, instead uses optical coupler/splitters and optical isolators. In FIGS. 5a, 5b and 5c, features common to earlier Figures bear the same reference numerals and will not be further discussed here, except where details are changed. In FIG. 5a First and second optical connections 18, 28 provide an optical path between endpoint 10, a pair of "switchless" remote nodes 30b (as described in detail, below, with reference to FIGS. 5b and 5c) and endpoint 20.

Endpoint 10, now comprises OSC equipment transmitter 14 and key exchange equipment receiver 226. In addition, endpoint 10, now comprises local optical key transport timer 256 connected to temporarily disable operation of OSC equipment transmitter 14 in "key transport" mode. OSC equipment transmitter 14 and key exchange equipment receiver 226 are connected to first optical connection 18 via optical coupler/splitter 360. Endpoint 20, now comprises OSC equipment receiver 24 and key exchange equipment transmitter 206. OSC equipment receiver 24 and key exchange equipment transmitter 206 are connected to second optical connection 28 via optical coupler 362. In contrast to the switched embodiments, in FIG. 5a, QK signals are generated at endpoint 20—i.e. at the opposite endpoint to the OSC signals, which continue to be generated at endpoint 10. In FIG. 5a, OSC signals and QK signals both flow over the OSC channel (i.e. using OSC wavelengths and, in general, following the OSC path, rather than the data path, between endpoints 10, 20 but in opposite directions.

FIG. 5b shows OSC signal transmission through "switchless" remote node 30b, i.e. when not operating in "key transport" mode. In FIG. 5b, features common with FIGS. 2a and 2b bear the same reference numerals and will not be further discussed here, except where details are changed. Switchless remote node 30b comprises bypass arrangement 250, which includes a bypass section comprising fibers 314, 318 and optical isolator 330 and OSC signal section comprising fibers 312, 316 and management function 40. Switchless remote node 30b also comprises optical junctions in the form of wavelength-independent optical couplers 310, 320, where optical coupler 310 is connected to optical filter 32 and optical coupler 320 is connected to optical filter 34. Each of optical coupler 310 and 320 comprises a form of optical junction, through which optical signals can follow different paths.

As shown in FIG. 5b, the OSC signal is routed from optical filter 32, on first optical connection 18, to wavelength-independent optical coupler 310, where the OSC signal is split between two fibers 312 and 314. According to an embodiment, the coupler 310 may split the received OSC signal according to a power ration of 50:50 between fibers 312 and 314, although other ratios may also be selected, depending on circumstances. In practice, a 50:50 coupler can introduce a further 3 dB power loss, which may need to be taken into account when specifying transmit power levels. The split ratio can be altered to raise or lower attenuation, depending on the circumstances. For example, where it was calculated that the OSC can operate reliably with more than 3 dB of loss, the optical coupler may be set to introduce more loss on the OSC leg (e.g. fiber 312) so as to allow the QKD leg (e.g. fiber 314) to have less loss and so operate better. For example, an 80/20 optical split could impose ~8 dB loss on the OSC leg and only ~1 dB loss on the QKD leg. Following a first path from optical coupler 310, fiber 312 connects a first portion (e.g. 50%) of the OSC signal to receiver 42 of management function 40 where it is terminated (converted from optical to electrical). After processing by Management Function 40, the OSC signal is retransmitted (converted from electrical to optical) at optical transmitter 44, from where it flows through fiber 316 and second optical coupler 320 to optical filter 34 on second optical connection 28. Second optical coupler 320 is also connected over fiber 318 to optical isolator 330. Following a second path from optical coupler 310, fiber 314 connects a second portion (e.g. the remaining 50%) of the OSC signal to optical isolator 330, however, optical isolator 330 is configured to block the OSC signal (and any optical signal) received from first optical section 18 over fiber 314 but only to pass optical signals in the opposite direction, i.e. received from second optical section 28 over fiber 318. The second path may therefore be better understood as extending from second optical coupler 320 through fiber 318 to optical isolator 330 and through optical isolator 330 and fiber 314 to optical coupler 310.

Accordingly, the node of FIGS. 5a and 5b will pass data at a first wavelength via WDM 32, amplifier 36 and WDM 34. Accordingly, the node of FIGS. 5a and 5b will pass, during a first time period, an OSC at a second wavelength via WDM 32, optical coupler 310, management function 40, optical coupler 320 and WDM 34 and will pass, during a second time period, an optical signal that may comprise a stream of single photons and may carry at least a part of an encryption key at the second wavelength via WDM 34, optical coupler 320, optical isolator 330, optical coupler 310 and WDM 32. During the first time period, the OSC is able to follow a first and a second path of optical coupler 310 but the OSC via the second path of optical coupler 310 will be blocked by optical isolator 330. During the first time period, the OSC from transmitter 44 of management function 40 is able to follow a first path through optical coupler 320. During the second time period, the optical signal is able to follow the first and a second path through optical coupler 320 but the optical signal via the first path of optical coupler 320 will be blocked by disabled transmitter 44. During the second time period, the optical signal following the second path through optical coupler 320 will be passed by optical isolator 330 on to optical coupler 310. During the second time period, the optical signal will follow the second path through optical coupler 310 on to WDM 32.

FIG. 5c shows QK signal transmission in the opposite direction through "switchless" remote node 30b, i.e. when operating in "key transport" mode. Where transport timer 258 is present, encryption key transfer may be initiated at "switchless" remote node 30b in response to an "encryption key transfer" message received from EMS 270 or an alternative management node. In response to receipt of the "encryption key transfer" message, optical key transport timer 258 at the (or each) intermediate node 30b, activates for a predetermined time interval to disable optical transmitter 44. Referring back to FIG. 5a, QK signal generated at key exchange equipment transmitter 206, located at endpoint 20, follows second optical connection 28 to optical filter 34. According to an embodiment, optical filter 34 acts as a passive optical combiner that, in addition to combining signals originally received via first optical section 18, will also act to divert, according to wavelength, optical signals received from second optical connection 18. At optical filter 34, the QK signal is diverted to optical coupler 320, where the QK signal is split between fibers 316 and 318. According to an embodiment, the coupler 320 may split the received QK signal at a power ration of 50:50 between fibers 316 and 318, although other ratios may also be selected, depending on circumstances. Fiber 316 connects a first portion (e.g. 50%) of the QK signal to optical transmitter 44, which is disabled by timer 258 and blocks the QK signal from propagating further. Fiber 318 connects a second portion (e.g. 50%) of the QK signal to optical isolator 330 which passes the QK signal and connects it over fiber 314 to optical coupler 310. As described, above, optical coupler 310 is also connected to optical receiver 42 over fiber 312, for OSC signal transmission although OSC signal transmission is disabled in "key transport" mode by operation of timer 256 at endpoint 10. It will be understood that optical coupler 310 receives no signal from optical receiver 42 and passes the QK signal received through fiber 314 to optical filter 32, from where it is transmitted over first optical connection 18 and optical coupler 360 to key exchange equipment 226 at endpoint 10.

Figure 6:
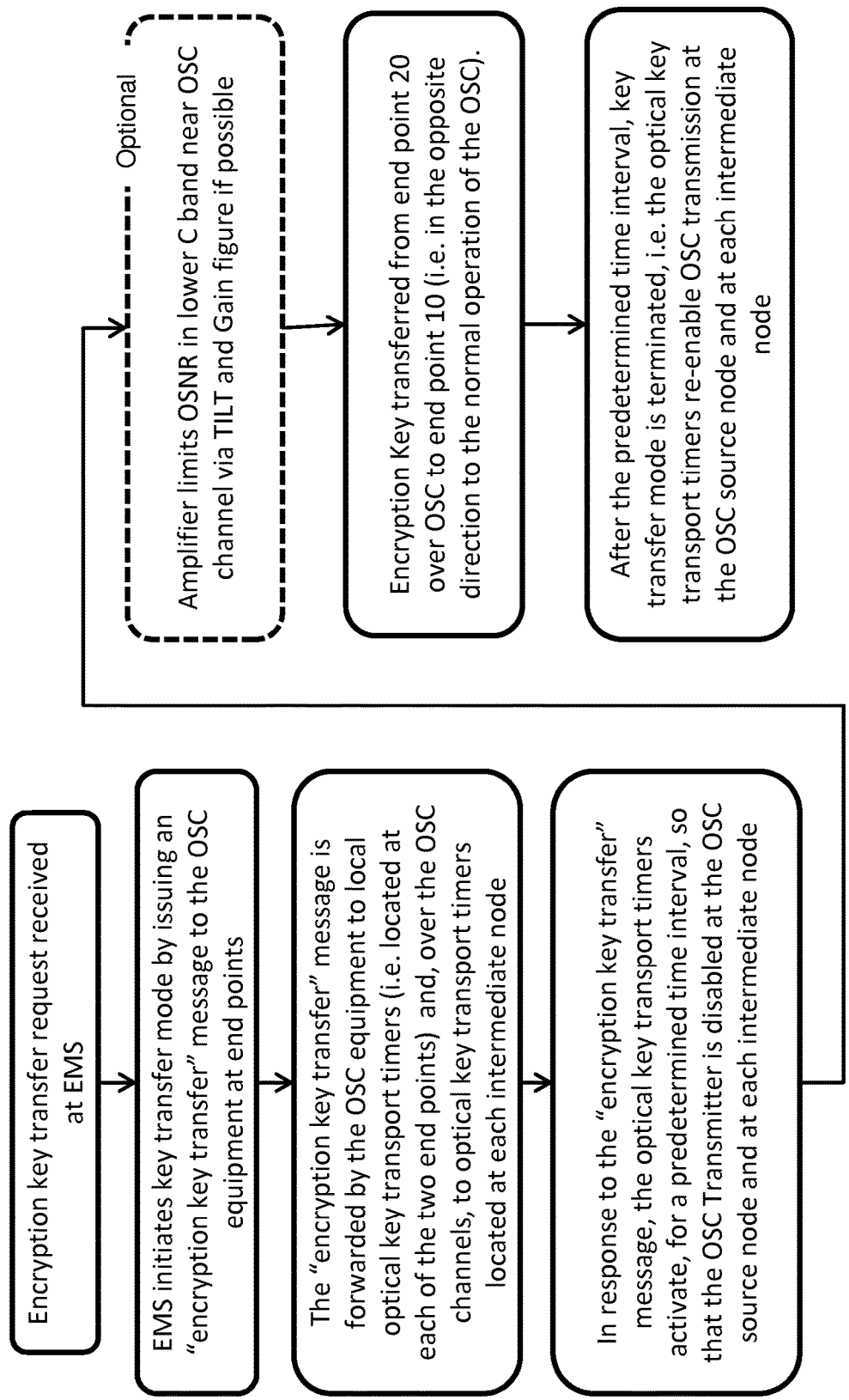

FIG. 6 shows operation of the communications networks of FIGS. 5a, 5b and 5c, with "switchless" bypass, during encryption key transmission. As shown in FIG. 6, on receipt of an encryption key transfer request, EMS 270 issues an "encryption key transfer" message, for example over Ethernet links 272 to the OSC equipment 14, 24 at each end point 10, 20. The "encryption key transfer" message is forwarded by the OSC equipment to local optical key transport timer 256 at endpoint 10 and, over the OSCs, to optical key transport timers 258 located at each intermediate node 30b (no local optical key transport timer is required at the QK transmit endpoint 20 according to this embodiment). In response to the "encryption key transfer" message, each optical key transport timer 256, 258 activates for a predetermined time interval to temporarily disable, once the "encryption key transfer" message has been forwarded to optical key transport timers 258 located at each intermediate node 30b, the OSC equipment transmitter 14 at endpoint 10 and at the management function transmit interface 44 at each intermediate node 30b. As before, the data channel amplifier 36 may limit gain near the OSC wavelengths, during key transfer. The encryption key is now transferred from end point 20 over the OSC to end point 10 (i.e. in the opposite direction to the normal operation of the OSC). After the predetermined time interval has elapsed, the optical key transport timers at each node re-enable the OSC equipment transmitter 14 at endpoint 10 and the management function transmit interface 44 at each intermediate node 30b. According to an embodiment, this re-enabling occurs at a time determined by the configuration of the timers and will occur whether or not the key transfer has successfully completed. The OSC returns to normal operation with OSC signals propagated from endpoint 10 to endpoint 20 via intermediate nodes 30b.

Figure 7:
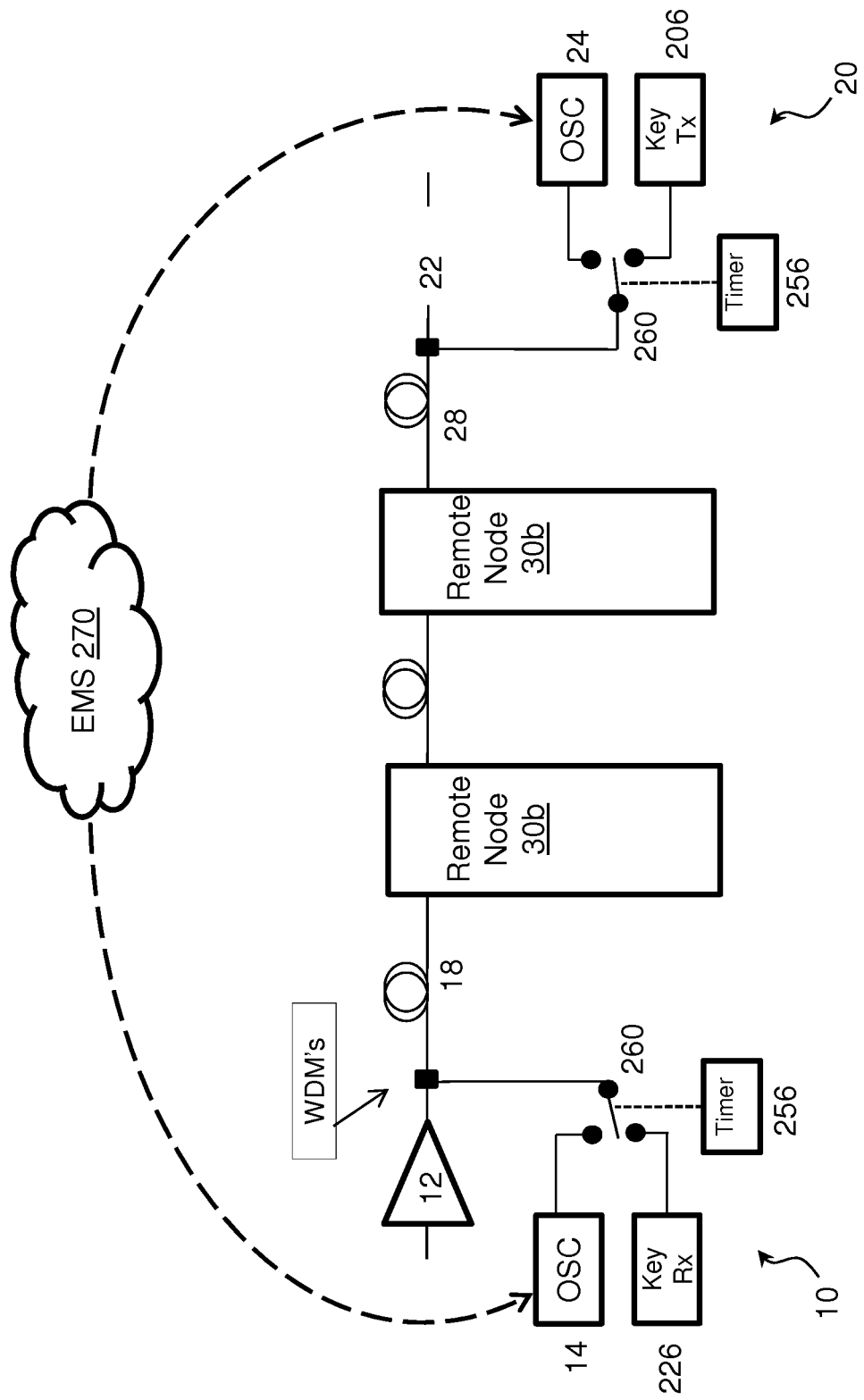

It will be understood that various combinations of the embodiments described, above, also fall within the scope of the present disclosure and one example will now be described with reference to FIG. 7. FIG. 7 shows a similar arrangement to FIGS. 5a, 5b and 5c, with passive ("switchless") intermediate nodes 30b but with switches 260 at each endpoint 10, 20. As with the arrangement of FIGS. 5a, 5b and 5c, endpoint 10 comprises OSC equipment transmitter 14 and key exchange equipment receiver 226, while endpoint 20 comprises OSC equipment receiver 24 and key exchange equipment transmitter 206. The operation of the arrangement of FIG. 7 will now be described with reference to FIG. 8.

Figure 8:
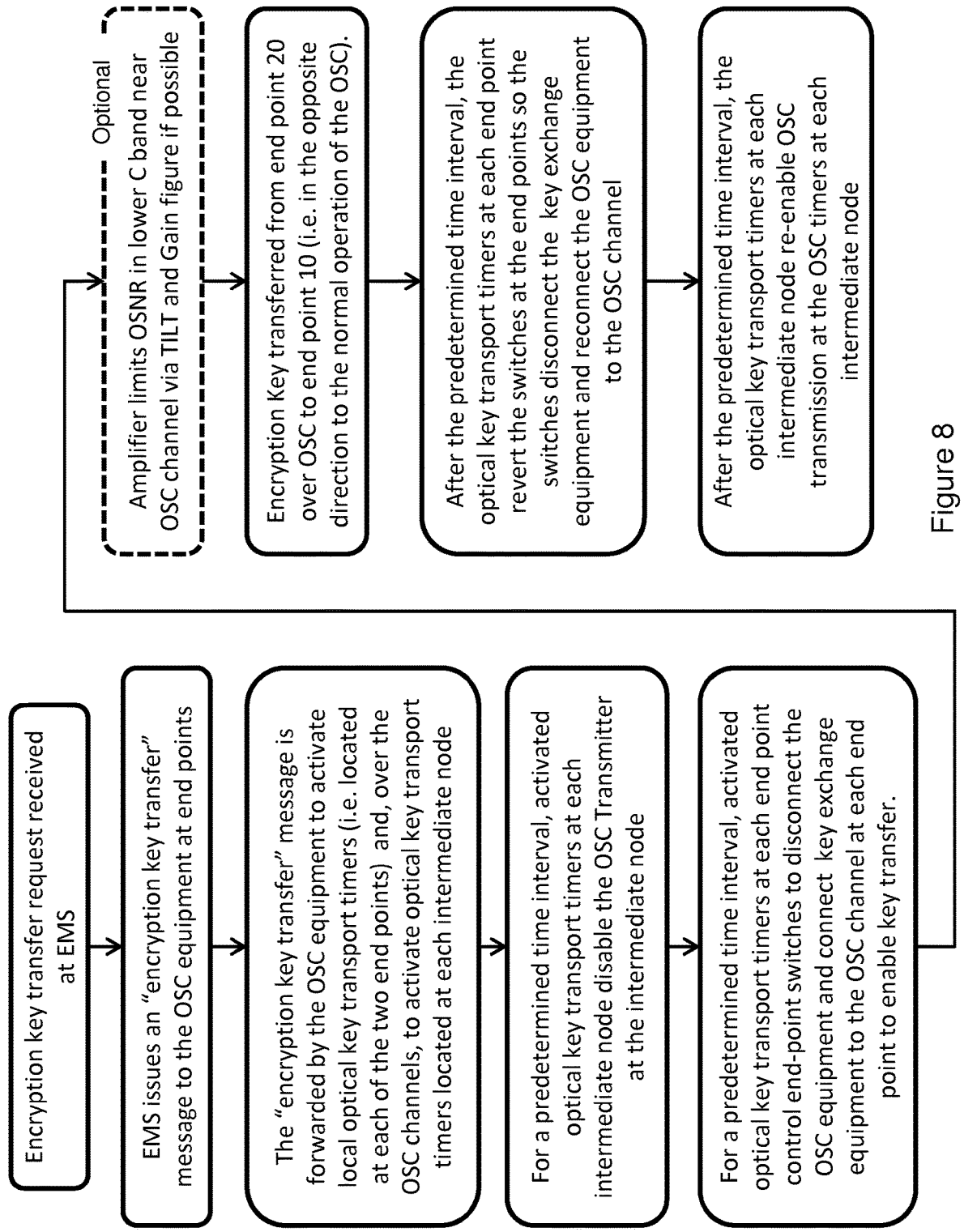

FIG. 8 shows operation of encryption key transmission in the communications networks of FIG. 7.

As shown in FIG. 7, on receipt of an encryption key transfer request, EMS 270 issues an "encryption key transfer" message, for example over Ethernet links 272 to the OSC equipment 14, 24 at each end point 10, 20. The "encryption key transfer" message is forwarded by the OSC equipment to local optical key transport timers 256. In response to the "encryption key transfer" message, each optical key transport timer 256 activates for a predetermined time interval, the end point switches 260, as follows. Once the "encryption key transfer" message has been forwarded to optical key transport timers 258 located at each intermediate node 30, the end point switch 260 operates to disconnect the OSC equipment 14, 24 and connect key exchange equipment 206, 226 at end points 20, 10, respectively, to the OSC to enable key transfer. That is, end point switch 260 at end point 10, switches to connect key exchange equipment receiver 226 to the OSC on first optical connection 18 in place of OSC equipment 14. Similarly, end point switch 260 at end point 20 switches to connect key exchange equipment transmitter 206 to the OSC on second optical connection 28 in place of OSC equipment 24. The "encryption key transfer" message is forwarded by the OSC equipment over the OSCs, to optical key transport timers 258 located at each intermediate node 30b). In response to the "encryption key transfer" message, each optical key transport timer 258 activates for a predetermined time interval to temporarily disable the management function transmit interface 44 at each intermediate node 30b. The encryption key is now transmitted by key exchange equipment transmitter 206 and transferred to key exchange equipment receiver 226 located at end point 10 (i.e. in the opposite direction to the normal operation of the OSC). After the predetermined time interval has elapsed, the optical key transport timers at each intermediate node re-enable the management function transmit interface 44 at each intermediate node 30b. According to an embodiment, this re-enabling occurs at a time determined by the configuration of the timers and will occur whether or not the key transfer has successfully completed. After the predetermined time interval, the optical key transport timers at each endpoint 10, 20 revert the switches 260 to their normal, OSC state. According to an embodiment, this occurs at a time determined by the configuration of the timers and will occur whether or not the key transfer has successfully completed. That is, end point switch 260 at end point 10, disconnects key exchange equipment receiver 226 from the OSC and reconnects the OSC equipment 14. Similarly, end point switch 260 at end point 20, disconnects key exchange equipment transmitter 206 from the OSC on second optical connection 28 and reconnects the OSC equipment 24. As before, the data channel amplifier 36 may limit gain near the OSC wavelengths, during key transfer.

According to an embodiment, different optical key transport timers may have different characteristics. For example, the predetermined time interval, characteristic of the optical key transport timers at the end points may differ from the predetermined time interval, characteristic of the optical key transport timers at the intermediate nodes.

Where for simplicity a single fiber is shown in the Figures, with traffic (data, DWDM) and OSC in one direction the skilled person will understand that a second fiber with all elements reversed may be provided to carry traffic and OSC in the opposite direction for bidirectional operation. It will be understood that a second fiber would also allow QKD to take place in the opposite direction to QKD through the first fiber. Where specific optical elements are described for purposes such as separating, combining, blocking or passing an optical signal, whether on the basis of wavelength, power or otherwise, the skilled person will also understand that these elements are merely examples and that alternative elements may be used, where available.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A communications network node comprising:
   a first optical port and a second optical port;
   a first amplified optical section connected between the first optical port and the second optical;
   a second non-optical section connected between the first optical port and the second optical port,
   a first optical filter comprising a first path for selected optical channels at a first wavelength and a second path for selected optical channels at a second wavelength;
   a second optical filter comprising a third path for selected optical channels at the first wavelength and a fourth path for selected optical channels at the second wavelength, wherein a first composite path through the communications network node comprises, in an order, the first optical port, the first path, the first amplified optical section, the third path and the second optical port; and
   an optical bypass section connected between the first optical port and the second optical port and a first optical junction and a second optical junction, wherein the first optical junction comprises a fifth path and a sixth path, and the second optical junction comprises a seventh path and an eighth path, wherein; a second composite path through the communications network node comprises, in an order, the first optical port, the second path, the fifth path, the second non-optical section, the seventh path, the fourth path and the second optical port, wherein; a third composite path through the communications network node comprises, in an order, the first optical port, the second path, the sixth path, the optical bypass section, the eighth path, the fourth path and the second optical port;
   wherein the communications network node is configured to pass a first optical channel at a first wavelength over the first composite path and a second optical channel at a second wavelength over the second composite path during a first time period and over the third composite path during a second time period.

2. The communications network node of claim 1, wherein the second optical channel comprises a classic waveform signal in the first time period and a single-photon stream in the second time period.

3. The communications network node of claim 1, wherein the second optical channel comprises at least a part of an encryption key in the second time period.

4. The communications network node of claim 1, wherein the first optical junction comprises a first switch and the second optical junction comprises a second switch.

5. The communications network node of claim 4, in which wherein the first switch is configured to connect the second path to the second non-optical section during the first time period and to connect the second path to the optical bypass section during the second time period.

6. The communications network node of claim 4, wherein the second switch is configured to connect the fourth path to the second non-optical section during the first time period and to connect the fourth path to the optical bypass section during the second time period.

7. The communications network node of claim 1, wherein the communications network node is configured to pass the second optical channel over the second non-optical section in a direction from the first optical junction to the second optical junction, and to pass the second optical channel over the optical bypass section in a direction from the second optical junction to the first optical junction.

8. The communications network node of claim 1, wherein the optical bypass section comprises an optical isolator configured to pass optical signals received from the second optical junction and to block optical signals received from the first optical junction.

9. The communications network node of claim 1, wherein the second non-optical section comprises an optical transmitter, and wherein communications network node is configured to enable the optical transmitter during the first time period and to disable the optical transmitter during the second time period.

10. The communications network node of claim 1, wherein the communications network node comprises a timer, and wherein a duration of the second time period is a pre-set characteristic of the timer.

11. A communications network comprising a first terminating node and a second terminating node and a plurality of intermediate nodes, each intermediate node comprising the communications network node of claim 1, wherein the second time period is indicated by a timing signal, and wherein the timing signal is shared with the plurality of intermediate nodes to influence operation of each intermediate node.

12. The communications network of claim 11, wherein the timing signal is shared with the first terminating node and the second terminating node of the communications network to influence operation of the first terminating node and the second terminating node.

13. A communications network comprising the communications network node of claim 1.

14. A method for operating a communications network node, the communications network node comprising a first amplified optical section connected between a first optical port and a second optical port, a second non-optical section connected between the first optical port and the second optical port, and an optical bypass section connected between the first optical port and the second optical port, the method comprising:
receiving at the communications network node, a first optical channel at a first wavelength and a second optical channel at a second wavelength;
directing the first optical channel to the first amplified optical section; and
directing the second optical channel to the second non-optical section during a first time period and directing the second optical channel to the optical bypass section during a second time period.

15. The method of claim 14, wherein the first optical channel occupies a first wavelength and, during both the first time period and the second time period, the second optical channel occupies a second wavelength.

16. The method of claim 14, further comprising:
during the first time period, passing the second optical channel over a first path of a first optical junction and a first path of a second optical junction; and
during the second time period, passing the second optical channel over a second path of the first optical junction and a second path of the second optical junction.

17. The method of claim 14, further comprising receiving at the communications network node a timing signal and deriving from the timing signal an indication of the second time period.

18. The method of claim 17, further comprising sharing the timing signal with a first terminating node and a second terminating node of a communications network to influence operation of the first terminating node and the second terminating node by at least one of:
in the second time period, establishing at the first terminating node a connection between a source of a single-photon stream and the communications network node; or
in the second time period, establishing at the second terminating node a connection between a destination of the single-photon stream and the communications network node.

19. The method of claim 14, wherein the method further comprises;
during the first time period, passing the second optical channel through the communications network node over the second non-optical section in a first direction; and
during the second time period, passing the second optical channel through the communications network node over the optical bypass section in a second direction opposed to the first direction.

20. The method of claim 14, further comprising enabling an optical transmitter in the second non-optical section during the first time period and disabling the optical transmitter during the second time period.

21. A non-transitory computer-readable storage medium storing a computer program comprising instructions which, when the computer program is executed by a computer, cause the computer to carry out the method of claim 14.

* * * * *